United States Patent [19]

King et al.

[11] Patent Number: 4,790,177

[45] Date of Patent: Dec. 13, 1988

[54] SHIFTING CONTROL FOR AUTOMATED MANUAL TRANSMISSION SHIFTER

[75] Inventors: Francis G. King, Bloomfield Hills; Stewart V. Gable, Ypsilanti, both of Mich.

[73] Assignee: Ford Motor Company, Dearborn, Mich.

[21] Appl. No.: 106,476

[22] Filed: Oct. 9, 1987

[51] Int. Cl.⁴ .......................................... G01M 15/00
[52] U.S. Cl. ................................................. 73/117
[58] Field of Search .................. 73/117, 117.2, 117.3, 73/118.1; 364/426, 551

[56] References Cited

U.S. PATENT DOCUMENTS 2,281,159 10/1939 Kliesrath et al. .
3,465,577 9/1969 Donovan .
3,516,287 6/1970 Masuda et al. .
3,712,126 1/1973 Campbell ............................. 73/117
3,713,332 1/1973 Herrbrich .
4,544,824 11/1985 King et al. ........................... 73/117

Primary Examiner—Stewart J. Levy
Assistant Examiner—Robert R. Raevis
Attorney, Agent, or Firm—Peter Abolins; Keith L. Zerschling

[57] ABSTRACT

Transmission shifting method with clutch pedal and accelerator pedal control for the automatic operation of manual shifting mechanisms in an automotive vehicle include gear shifting, open loop accelerator pedal control during shifting, acceleration from idle with slow clutch release, deceleration to idle, control of coasting, and determining clutch engagement point and shifter positions at various gear shift points.

9 Claims, 4 Drawing Sheets

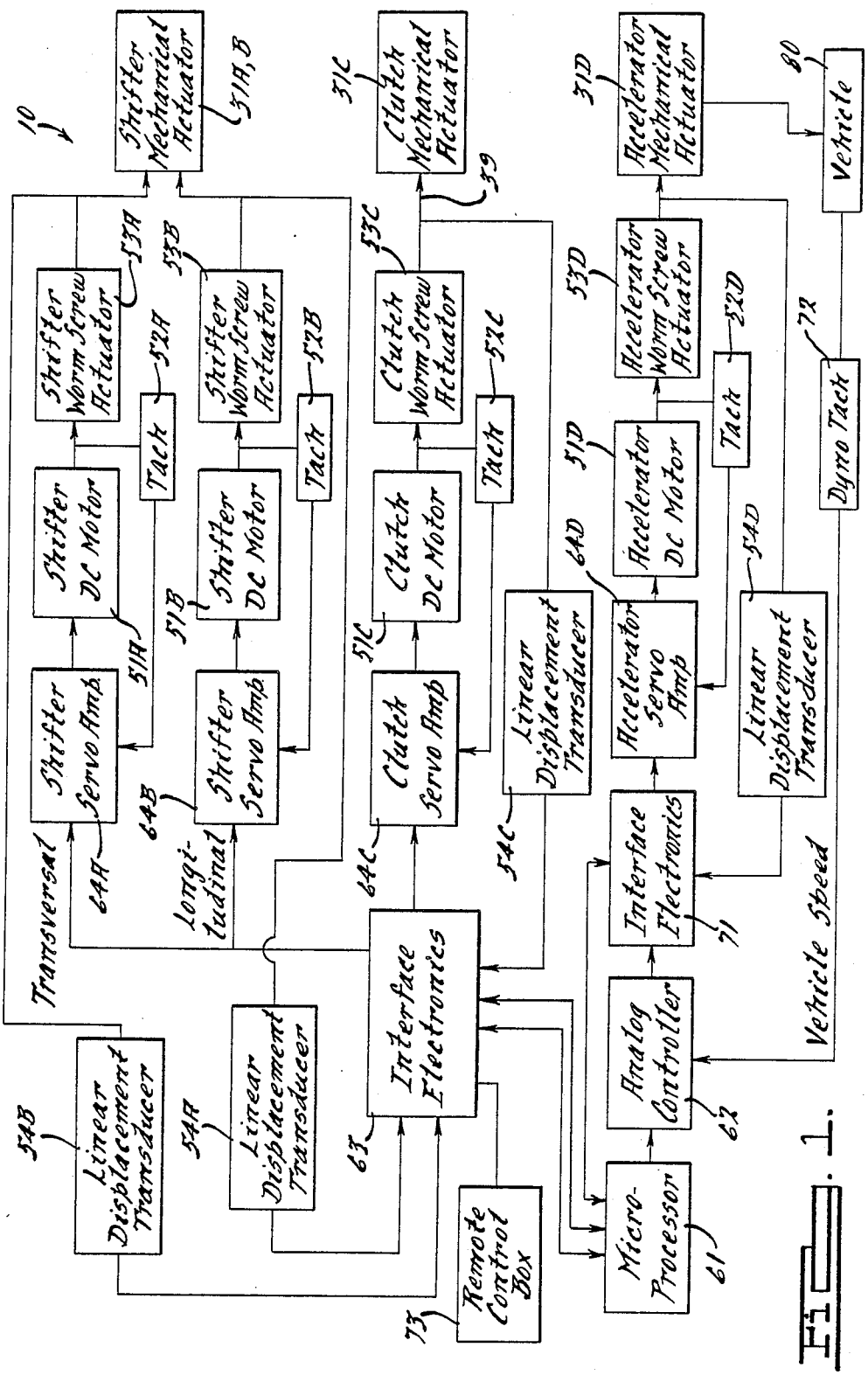

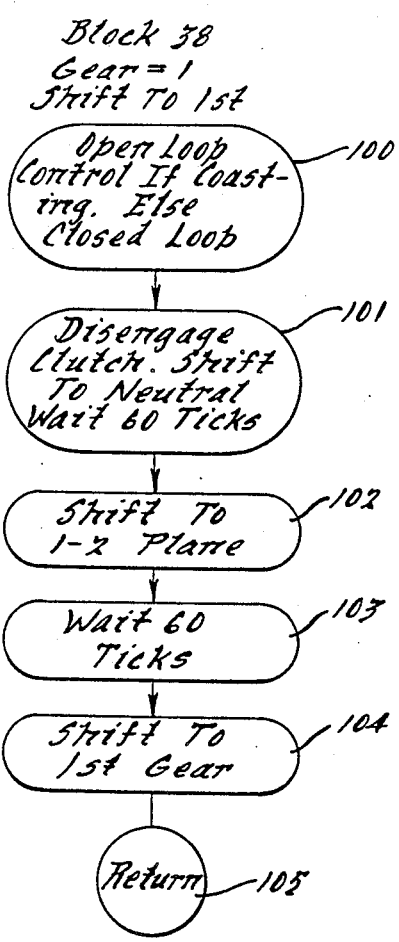
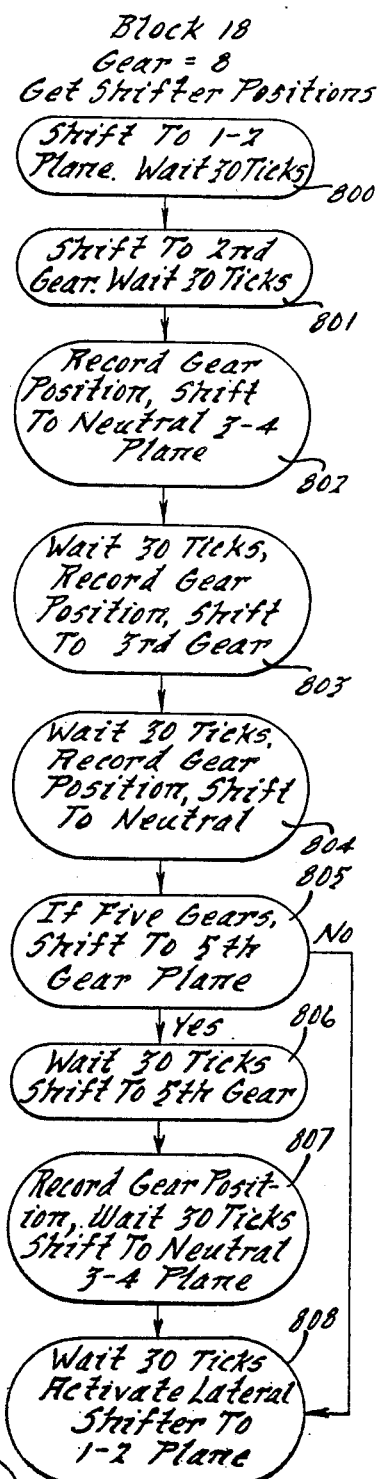
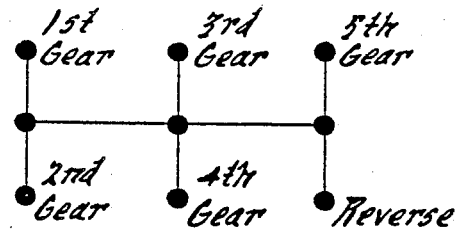
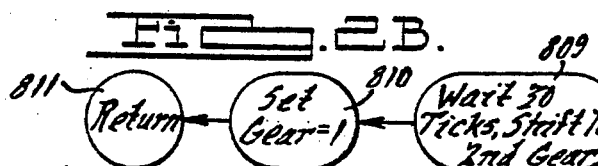

SHIFTING CONTROL FOR AUTOMATED MANUAL TRANSMISSION SHIFTER

BACKGROUND OF THE INVENTION

1. Technical Field

This invention relates to apparatus for manipulating the powertrain controls of an automobile.

2. Prior Art

U.S. Pat. No. 2,281,159 to Kliesrath et al discloses a transmission operating mechanism including a vacuum operated motor 20 connected to a lever 26. A vacuum operated motor for the gear shifter is mounted on the dashboard while a vacuum operated motor for the clutch is mounted behind the fire wall.

U.S. Pat. No. 3,713,332 to Herrbrich teaches an automatic manual transmission shifting mechanism including working cylinders 15 and 16 attached to gear shift lever 20 and the cylinder 14 attached to a clutch pedal 19. This system uses a double pneumatic cylinder system on a base frame, the installation of which requires the removal of the driver's seat.

U.S. Pat. No. 3,465,577 issued to Donovan teaches an automatic manual transmission shifter including hydraulic cylinders 76 and 78 attached to column gear shift lever 26 and hydraulic cylinder 34 attached to clutch pedal 16. In this system the hydraulic cylinders for column shifting are mounted on an external support which extends into the vehicle.

U.S. Pat. No. 3,516,287 issued to Masuda et al teaches a servo cylinder 7, lever select cylinder 43 and side shift cylinder 44. The system is designed for use with a dynamometer test platform where the hydraulic cylinders are mounted next to the power train components.

The uncovered prior art patents teach either a pneumatic or hydraulic system for actuation of the automobile control apparatus. None of the uncovered patents teach a control methodology used to perform the shifting of the transmission gears in conjunction with the motion of the clutch and accelerator pedals. This invention overcomes these problems and teaches such a computer control methodology which allows automatic operation of a manual shifting mechanism including gear selection, clutch actuation and accelerator pedal actuation.

SUMMARY OF THE INVENTION

This invention teaches a method for shifting transmission gears for the automatic operation of manual shifting mechanisms in an automotive vehicle using actuators for moving the gear shift lever, accelerator pedal, clutch pedal and brake pedal. If desired, such shifting permits a test vehicle to follow a predetermined drive cycle relating vehicle speed to time. The method includes gear upshifting to second gear, downshifting to second gear, and upshifting to third, fourth and fifth gears. During shifting, open loop accelerator pedal control is implemented. Open loop accelerator pedal control is also used during accelerations from idle when the clutch pedal is released slowly. Means to control coasting conditions and deceleration to idle are also taught. Advantageously, the invention also includes determining the clutch engagement point and the position of the actuators at the various gear shift points.

BRIEF DESCRIPTION OF THE DRAWINGS

FIG. 1 is a block diagram of the operation of the gear shifting and clutch actuation means;

FIG. 2B is a logic flow diagram of the operation of block 18 of FIG. 2A showing the necessary steps to determine the gear shift positions in accordance with an embodiment of this invention;

FIG. 2C is a logic flow diagram of the operation of block 38 of FIG. 2A showing a first gear shifting operation for use in accordance with an embodiment of this invention;

FIG. 3 is a diagram of a gear shift pattern for use in accordance with an embodiment of this invention.

DETAILED DESCRIPTION OF THE INVENTION

Figure 2A:
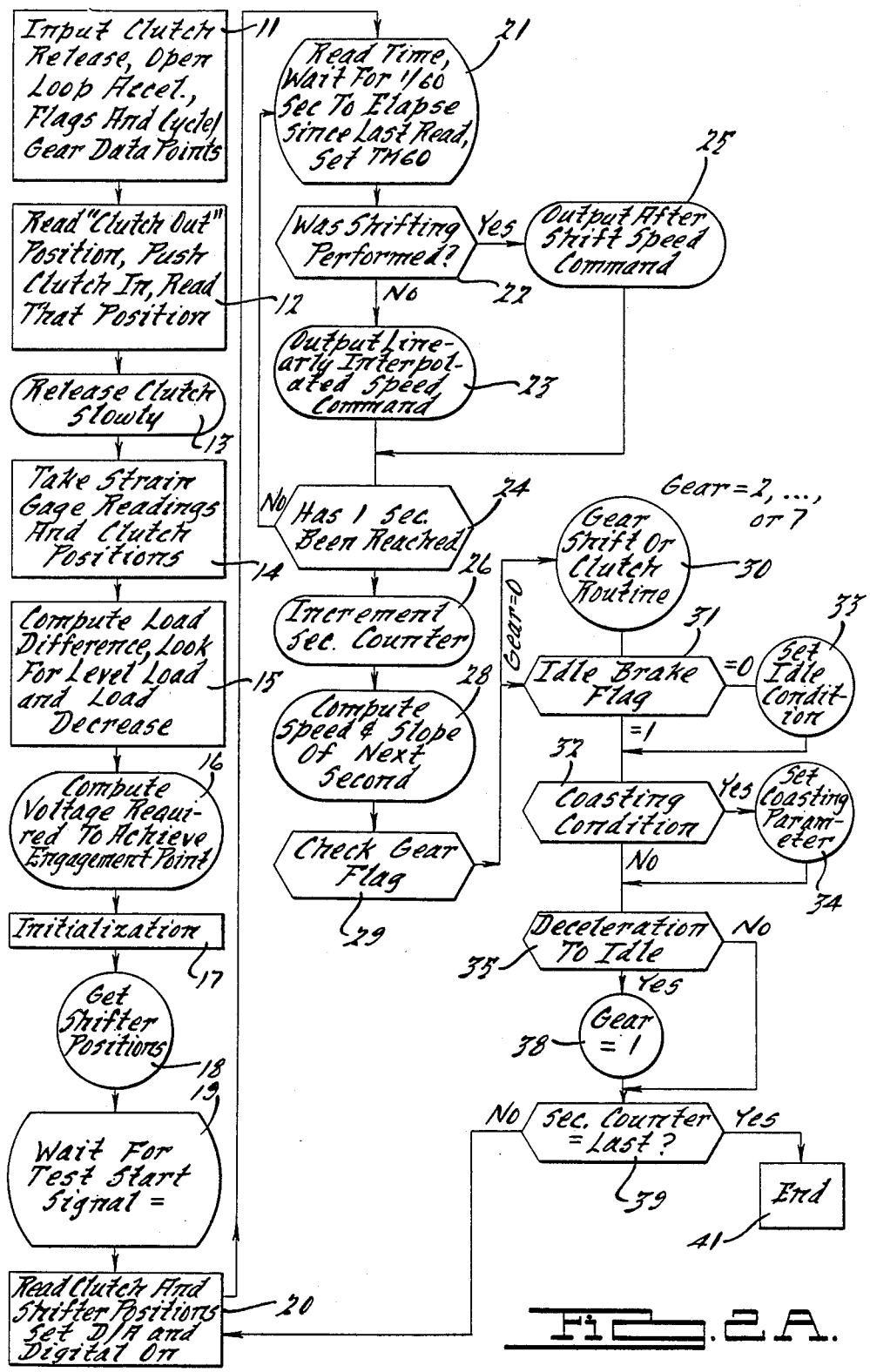
FIG. 2A is a logic flow diagram of the operation of an automated manual transmission shifter in accordance with an embodiment of this invention.

Referring to FIG. 1, an automated manual transmission shifter 10 includes a transversal shifter actuator 53A, a longitudinal shifter actuator 53B, and a clutch actuator 53C. Working in cooperation is an electronic accelerator pedal actuator 53D, which moves a mechanical accelerator pedal actuator 31D. The electronic accelerator pedal actuator functions either under open or closed loop. The closed loop control is activated through an analog controller 62. Open loop control is commanded by a microprocessor 61 through interface electronics 71 to an accelerator servo amplifier 64D. Two analog output channels in microprocessor 61 are used for the open and closed loop controls of accelerator pedal actuator 53D. Another analog output channel is used for the control of longitudinal shifter actuator 53B while a fourth analog output channel, the clutch actuator 53C. For the control of the transversal shifter actuator, 53A, two digital output channels (or another analog output channel) are used. Or, if desired, another analog output channel can be used for transversal shifter actuator 53A. In operation, automated manual transmission shifter 10 permits the speed of a test vehicle to follow a desired, predetermined drive cycle specifying the speed of the vehicle with respect to time.

Analog input channels within automated manual transmission shifter 10 record vehicle speed (from dyno tachometer 72), clutch actuator position (from linear displacement transducer 54C), shifter actuator positions (from linear displacement transducers 54A and 54B), accelerator pedal actuator touch signal, and load on the clutch pedal actuator. Vehicle speed is used for closed loop control of accelerator pedal actuator 31D. Shifter actuator positions are read to insure that the actuators have moved to the desired gear positions. The touch signal from accelerator pedal actuator 31D is used to define the idle position for accelerator pedal actuator 31D. The clutch engagement point is determined with the load on the clutch pedal.

By recording in microprocessor 61 both the clutch actuator position and the load on the clutch pedal during a slow release of the clutch pedal, the position of where the clutch engagement point occurs is determined. The control of the clutch actuator is designed so that its motion is a linear function of the input voltage.

Hence positioning the clutch at its engagement point can be provided through a linear change in the input voltage.

In successive motion, shifter actuators 53A and 53B are moved to various gears to record the position of the actuators at those gears. For five gears, the positions include first-second gear plane at neutral, second gear, third-fourth gear plane at neutral, third gear, fifth gear plane at neutral, and fifth gear (see FIG. 3). After recording the positions of the actuators, they are moved to first gear via second gear for the start of the test. This motion through the second gear is required to insure that the gears in the transmission will mesh rather than landing on the teeth.

During shifting, accelerator pedal control is open loop. Depending on the drive cycle, the open loop control command varies from negative to positive increments from the pedal touch position. This minimizes the loss of vehicle speed during shifting. Also, by increasing the value of the drive cycle commands at the shift points, loss of vehicle speed can further be minimized. Immediately at the end of the shift, accelerator pedal control becomes closed loop again. To avoid possible severe throttle actuation at that instant, the closed loop command is modified to a lesser speed. This modification and the open loop control command are determined from data inputs to the program.

Accelerator pedal control is also open loop during acceleration from idle. About 3 seconds prior to the acceleration from idle, a flag from the drive cycle file will indicate to the program to enter into the routine to slowly release the clutch. This routine will also provide the open loop control for the accelerator pedal. Except for some instances, which will be called a coasting condition, open loop actuator control begins after a 90 tick (1/60 of a second equals each tick) wait into the routine. Advantageously, each tick is generated as a function of clock reference within the automated manual transmission shifter 10. During this waiting period, there is no braking or throttle actuation. The initial amount of open loop throttle varies depending on the acceleration rate from idle. After 30 ticks have passed, the clutch pedal is released to the clutch engagement point. At that point, the slow release of the clutch begins. The duration and rate of clutch release vary for different accelerations from idle. Each incremental release of the clutch is accompanied by an increase in throttle. This throttle increase is also a changing parameter. The clutch pedal release is completed either when the duration of the release is up or when the pedal is fully retracted. At that time, accelerator pedal control returns to closed loop control. The clutch release could also be superseded by requests of upshifts to second gear.

On deceleration to idle, the clutch pedal is depressed when vehicle speed drops to 15 mph. Braking continues (hence the accelerator pedal is already retracted), and the gear lever is moved to its neutral position. After waiting 60 ticks, the lever is moved to the first-second gear plane and after another wait of 60 ticks, to first gear. The clutch pedal is held at its depressed position until it is released slowly on the next acceleration.

The coasting condition usually occurs during decelerations to idle. The coasting condition permits the speed of a test vehicle to follow certain portions of the drive cycle. When compared to the normal deceleration to idle routine, there is no braking and no throttle. Hence, when the clutch is depressed for shifting into first gear, the vehicle is coasting. When the drive cycle specifies an acceleration from idle after the coasting condition, the program enters into the slow clutch release routine. If, during this part of the cycle, braking is required, it will be turned on in the slow clutch release routine only in this special instance. Also in this case, the initial open loop accelerator actuator control does not necessarily become effective after 90 ticks.

There are five shifting routines: upshift to second, shift to third, shift to fourth, upshift to fifth, and downshift to second. The shifting routines to third and fourth gears can accommodate both upshifts and downshifts.

When shifting from first to second gear, the clutch pedal, usually, is still being released slowly as described above. This release motion is stopped and clutch pedal is depressed. To ensure that the clutch engagement point is reached, there is a waiting period of thirteen ticks. During this time, the accelerator pedal is still under the control of analog controller 62. After that period the control of the accelerator pedal is changed to open loop as described earlier. Shifting is commanded and the program waits until the shifter actuator has reached its pre-recorded position. Ten ticks of waiting time is added before allowing the accelerator pedal to be released. Shifting is complete when the clutch pedal has moved to some predetermined distance beyond the clutch engagement point.

The shifting routines to third, fourth and fifth gears are identical except for the duration of the waiting times. The shifting begins with depressing the clutch pedal then comes a waiting period of seven, six, and seven ticks for third, fourth, and fifth gear shifts, respectively. After the waiting period, the accelerator pedal control becomes open loop. There is another waiting period of sixteen, seven and sixteen ticks for third, fourth and fifth gear shifts, respectively, before shifting is performed. The program waits until the shifter actuator has reached its pre-recorded position. The routine which performs shifting to fourth gear, has another waiting period of five ticks. Shifting is complete when accelerator pedal control returns to closed loop control and the clutch pedal has moved to some predetermined distance beyond the clutch engagement point.

The clutch pedal is depressed to begin the downshift to second gear and the program waits for thirteen ticks. Longitudinal shifter actuator 53B is activated to move the shift lever to the neutral position and at the same time the accelerator pedal control becomes open loop. After waiting for ten ticks, the transversal shifter actuator 53A is activated to move the shift lever to the first-second gear plane. The program waits for twelve ticks before shifting to second gear. After checking to insure that the shifter has achieved its pre-recorded position at second gear, there is another waiting period of ten ticks. Then the accelerator pedal actuator control becomes closed loop and clutch pedal is released. When the clutch pedal has moved to some predetermined distance beyond the clutch engagement point, the shifting is complete.

An advantageous aspect of coding the above shifting, clutch and accelerator pedal control algorithms in a computer is the ability to enter and exit from these algorithmic routines at almost every tick. It allows the constant update of vehicle speed at the main portion of the program so as to follow the drive cycle closely.

Referring to FIG. 2A, an automatic driver system automated manual transmission shifter software flow chart includes the sequential coupling of a block 11 for inputting clutch release and open loop acceleration parameters, and braking and gear shifting flags and cycle data points, a block 12 for reading a clutch out position, a block 13 for releasing the clutch slowly, a block 14 for taking a strain gauge reading and clutch position, a block 15 for computing load difference and looking for a level of strain or unstrained decrease, a block 16 computing voltage required to achieve an engagement point, a block 17 for initialization. Subsequent sequential logic actions include a block 18 for establishing shifter positions and a block 19 for waiting for test start signal. Upon receipt of the test start signal, logic flows from block 20 through block 39 every second to control the shifter and pedal actuators. Block 20 reads clutch and shifter positions and sets outputs for digital and analog channels. For each second, blocks 21 through 25 are executed 60 times to output vehicle speed command. Hence, block 21 waits for 1/60 second, also known as a tick, to elapse. Vehicle speeds are output by the either block 23 or 25. Even though a predetermined drive cycle is used, the output value of the vehicle speed depends on whether shifting operation has been performed. Block 22 queries whether a shifting has been performed. Block 23 outputs vehicle speed when no shifting has been performed. If shifting has occurred, the output value of the vehicle speed, given by block 25, is taken from open loop accelerator parameters which were input from block 11. Block 24 is the looping control for executing blocks 1 through 25 60 times every second.

Following block 24 are block 26 which increments the second counter, block 28 which computes speed and slope of the next second, and block 29 which checks the gear flag. If the vehicle speed in the predetermined drive cycle is given at each second rather than at each tick, a linearly interpolated speed is assumed between any two seconds, so that the vehicle speed, that is output at every tick, would correspond closely to the predetermined drive cycle. The slope of the speed profile is, therefore, required for the linear interpolation. Block 30 performs shifting of gears. It is skipped if there is no gear shifting. Logic flow continues with block 31 which checks the idle brake flag, which is an input parameter from block 11 as a function of the predetermined drive cycle. If idle brake flag is 1 then logic flow proceeds to query for a coasting condition in block 32. If the idle speed brake flag of block 31 is 0, then logic flow goes to set idle condition in block 33 and continues with block 32. If a coasting condition exists then logic flow goes to block 34 from block 32 and accelerator and clutch pedal duration variables are set to the coasting parameters. To perform a coasting, the clutch should be disengaged and there should be no braking or acceleration. The duration of clutch disengagement is one of the coasting parameters. The duration until the time when the accelerator pedal should be depressed is the other coasting parameter. Both parameters are determined from the speed and coasting duration of the predetermined drive cycle. If there is no coasting condition at block 32, logic flow goes to a block 35 to check for deceleration to idle. Deceleration to idle is determined by looking at the vehicle speed given in the predetermined drive cycle. The condition occurs when the prescribed speed falls from above 15 miles per hour towards 0 mile per hour over period of 5 seconds. If there is no deceleration to idle, logic flow goes to a block 39 which increments the time and queries for end of test. If there is a deceleration idle, logic flow goes to a block 38 which puts shifter into first gear and logic flow continues with block 39. If the second counter is not last, logic flow goes back to block 20, and if the second counter is last, then program comes to an end in block 41.

Referring to FIG. 2B, logic flow for a gear flag value of 8 is shown as determing shifter positions. Logic flows sequentially from a block 800 to shift gear lever to the one-two plane and to wait a predetermined time period of thirty ticks, to block 801 to shift gear lever to second gear and wait thirty ticks, to a block 802 to record gear shifting actuator positions and to shift gear lever to neutral three-four plane, to a block 803 to wait thirty ticks, record gear shifting actuator positions, shift gear lever to third gear. Block 804 requests a wait of 30 ticks, records gear shifting actuator positions, shifts gear lever to neutral; block 805 queries for five gear positions in the transmission and shift the gear lever to the fifth gear plane. Next, a block 806 waits thirty ticks and shifts the gear lever if a fifth gear exists to fifth gear. Block 807 records the gear shifting actuator positions, waits 30 ticks and shifts the gear lever to neutral three-four plane. Then logic flow goes to a block 808 to wait thirty ticks and activate lateral shifter to one-two plane. If block 805 indicates the absence of a fifth gear, then logic flows directly to block 808. From block 808, logic goes to block 809 to wait thirty ticks and shift the gear lever to second gear, to block 810 to set gear flag to one and to block 811 to return.

Referring to FIG. 2C, logic flow for a first gear operation is shown as shifting to first gear. For gear operation 1, block 100 provides either open loop or closed loop control for the accelerator pedal. Open loop control is used when a coasting condition is encountered, otherwise closed loop control is employed. Logic flow then goes to a block 101 which disengages the clutch, shifts gear lever to neutral, and waits for sixty ticks. Block 102 shifts the gear lever to the one-two plane; block 103 puts the program in 60 tick wait loop; block 104 shifts the gear lever to first gear; block 105 returns logic flow to the main program.

Figure 2D:
FIG. 2D is a logic flow diagram of the operation of block 30 of FIG. 2A showing a second through a fifth gear upshift and downshift operation in accordance with an embodiment of this invention.

Referring to FIG. 2D, logic flow for the gear flag being equal to 2 through 7 is shown as shifting to second gear (2), shifting to third gear (3), shifting to fourth gear (4), shifting to fifth gear (5), slow clutch release (6), and downshift to second gear (7). Second gear shifting operation starts with a block 200 which disengages the clutch to stop the slow release of the clutch if necessary. Logic flow continues with a block 201 which waits 13 ticks, a block 202 which shifts the shifter to second gear, a block 203 which provides open loop accelerator pedal control, a block 204 which checks the gear position and waits 10 ticks, a block 205 which returns to closed loop accelerator pedal control and engages the clutch, a block 206 which checks the clutch position and a block 207 which returns logic flow to main program.

Shifting to third, fourth and fifth gears is controlled using logic flow including a block 300 to disengage the clutch, a block 301 to wait seven, six or seven ticks for third, fourth, or fifth gears, respectively. Logic flow from block 301 goes to a block 302 which provides open loop accelerator pedal control, to a block 303 which requests the system to wait seven or 16 ticks, to a block 304 which performs the gear shift to third, fourth or fifth gear, to a block 305 which checks the gear position, to a block 306 which waits 5 extra ticks if the shifting is to fourth gear, to a block 307 which returns to closed loop accelerator pedal control and engages the clutch, to a block 308 which checks the clutch position and to a block 309 to return logic flow to the main program.

Slow release of the clutch is commanded when gear flag equals 6. Logic starts at a block 600 to release the brake, goes to a block 601 to wait ninety ticks, a block 602 to provide open loop accelerator pedal control, a block 603 to wait thirty ticks, a block 604 to move clutch to engagement point, a block 605 to slowly release the clutch and increase the throttle incrementally, a block 606 to stop release when time is up or clutch is out, a block 607 to return to closed loop accelerator pedal control and to move clutch pedal all the way out, and a block 608 to return logic flow to the main program.

Gear flag 7 signals a downshift operation to second gear. The operation starts with a block 700 to disengage the clutch and wait thirteen ticks, and then goes sequentially to a block 701 to shift gear lever to neutral and provides open loop accelerator pedal control, a block 702 to wait ten ticks, shift gear lever to one-two plane, a block 703 to wait twelve ticks, shift gear lever to second gear, a block 704 to check gear position and wait ten ticks, a block 705 to return to closed loop accelerator pedal control and to engage clutch, a block 706 to check clutch position, and finally a block 707 to return logic flow to the main program.

Referring to FIG. 3, a schematic diagram of the shift positions indicates that there is a typical "H" pattern for the first, second, third and fourth gears and that the reverse and the fifth gears are appendages off the "H".

Various modifications and variations will no doubt occur to those skilled in the arts to which this invention pertains. For example, the duration of waiting periods or values of the aforementioned parameters may be varied from that disclosed herein. The number of manual gear shift positions may also be extended or limited. These and all other variations which basically rely on the teachings through which this disclosure has advanced the art are properly considered within the scope of this invention.

We claim:

1. A transmission shifting method with clutch and accelerator pedal control using shifter and pedal actuators for the automatic operation of a manual transmission gear shift mechanism in an automotive vehicle, the automotive vehicle having a plurality of manual transmission shift positions, including first, second and third gears, wherein said actuators are used to control the shifting of gears and speed of a vehicle according to a predetermined drive cycle, said shifting method including the steps of:
   determining an engagement point for the clutch,
   recording actuator positions to control the speed of the vehicle,
   moving the clutch pedal to the engagement point with the clutch pedal actuator,
   recording the clutch actuator position and establishing that the clutch is disengaged,
   moving the gear shift actuators to the desired gear,
   recording the gear shift actuator position and establishing that the desired gear position is achieved,
   controlling the clutch and accelerator pedal actuators with sufficient frequency to achieve a desired speed for the vehicle during any shifting operation so as to be able to follow closely the prescribed vehicle speed of the predetermined drive cycle,
   gear upshifting from first gear position to second gear position,
   gear upshifting from second gear position to third gear position,
   gear downshifting from third gear position to second gear position,
   initiating acceleration from idle including releasing the clutch relatively slowly,
   initiating deceleration to an idle speed,
   controlling a coasting condition for the vehicle, and
   using open loop accelerator pedal control during shifting.

2. A transmission shifting method with clutch and accelerator pedal control as recited in claim 1 wherein said gear upshifting to second gear includes the steps of:
   using closed loop control for the acceleration pedal,
   moving the clutch pedal,
   waiting a first period for the clutch to travel to its engagement point,
   using open loop accelerator pedal control,
   shifting from the first gear position to the second gear position,
   waiting a second period for a shift actuator to reach a pre-recorded position;
   returning to closed loop control for the accelerator pedal; and
   releasing the clutch pedal.

3. A transmission shifting method with clutch and accelerator pedal control as recited in claim 2 wherein downshifting to second gear position includes the steps of:
   using closed loop accelerator pedal control,
   depressing the clutch pedal,
   waiting a time period after depressing the clutch,
   using open loop accelerator pedal control,
   shifting to neutral,
   waiting a second time period after initiating shifting,
   shifting to the first-second gear plane position,
   waiting a third time period after initiating shifting,
   shifting to second gear position,
   waiting a fourth time period for the actuator to reach the pre-recorded second gear position,
   returning to closed loop accelerator pedal control, and
   releasing the clutch pedal.

4. A transmission shifting method with clutch and accelerator pedal control as recited in claim 3 wherein accelerating from idle with slow releasing of clutch includes the sequential steps of:
   operating with closed loop acceleration control,
   using open loop accelerator pedal control,
   waiting a time period after initiating open loop acceleration pedal control,
   fast depressing of the clutch to engagement point,
   slow releasing of the clutch with incremental increase in open loop accelerator pedal command, and
   returning to closed loop accelerator control.

5. A transmission shifting method with clutch and accelerator pedal control as recited in claim 4 wherein deceleration to idle includes the sequential steps of:
   braking,
   depressing the clutch when the vehicle decelerates to a speed of about 15 mph,
   continuing braking,
   shifting the gear to neutral position,
   waiting a first time period after initiating shifting,
   shifting the gear to the first-second gear plane position,
   waiting a second time period after initiating shifting, and shifting the gear select to first gear position.

6. A transmission shifting method with clutch and accelerator pedal control as recited in claim 5 wherein controlling the coasting condition includes the sequential steps of:
decelerating without applying brake or throttle,
depressing of the clutch, and
using the brake with the slow clutch release routine during the next acceleration from idle 7. A transmission shifting method with clutch and accelerator pedal control as recited in claim 6 wherein using open loop accelerator pedal control during shifting includes sequential steps of:
selecting between a negative or positive open loop command from the accelerator pedal idle position,
minimizing vehicle speed loss by modifying the accelerator pedal command during shifting, and
minimizing severe throttle actuation after shifting by using a lower than normal accelerator pedal command immediately after the shifting.

8. A transmission shifting method with clutch and accelerator pedal control as recited in claim 7 wherein determining the clutch engagement point and recording actuator positions at various gear shift points includes the steps of:
recording both the load and position of the clutch pedal actuator,
having a linear control function for the clutch actuator,
linearly determining the voltage required to reach the clutch engagement point,
successively moving the gear shifter actuators to various gear shift positions to record their positions, and
shifting to first gear position through second gear position to assure meshing of the gear.

9. A transmission shifting method with clutch and accelerator pedal control as recited in claim 8 further comprising shifting gears to fourth and fifth gear positions and including the steps of:
depressing the clutch pedal,
waiting one time period chosen from a first set of time periods after depressing the clutch,
using open loop accelerator pedal control,
waiting one time period chosen from a second set of time periods after initiating open loop acceleration pedal control,
shifting between two gear positions,
waiting one period chosen from a third set of periods for the actuators to reach the pre-recorded position of the gear to which shifting was done,
using closed loop accelerator pedal control, and
releasing the clutch pedal.

* * * * *